Oct. 5, 1926.

C. BRASSFIELD 1,601,903

CLUTCH MECHANISM

Filed March 18, 1925

INVENTOR
Claud Brassfield
BY J. L. Rivers
ATTORNEY

Patented Oct. 5, 1926.

1,601,903

UNITED STATES PATENT OFFICE.

CLAUD BRASSFIELD, OF SEATTLE, WASHINGTON, ASSIGNOR OF ONE-HALF TO NELS GLANTZ, OF SEATTLE, WASHINGTON.

CLUTCH MECHANISM.

Application filed March 18, 1925. Serial No. 16,305.

My invention has reference to improvements in clutches, of the multiple dry disc variety, for motor vehicles, and its particular object is the provision of an assembly of parts adapted to be quickly and conveniently installed in a well known make of motor vehicle, said assembly taking the place of the cone now utilized in the clutch mechanism of said motor vehicle, and whereby the cone clutch therein may be converted into a multiple dry disc clutch, with the advantages incident to the use of such last-named clutch.

In the accompanying drawing—

Figure 1:
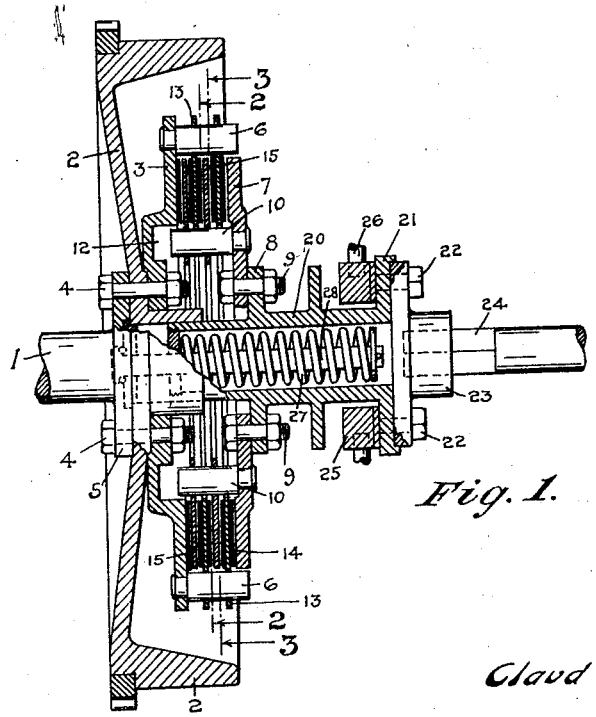

Figure 1 is a view in longitudinal section of the fly wheel of an engine and the device complete as mounted in operative position, the clutch housing being partly broken away, and the crank and transmission shafts shown in broken sections.

Figure 2:
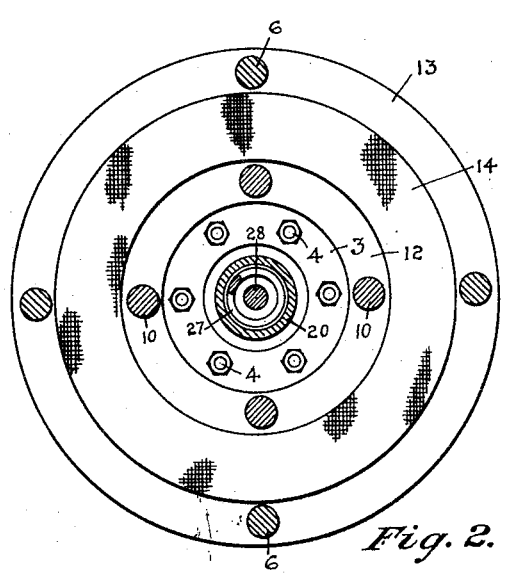

Fig. 2, a vertical sectional view of the device, drawn on the line 2—2, of Fig. 1.

Figure 3:
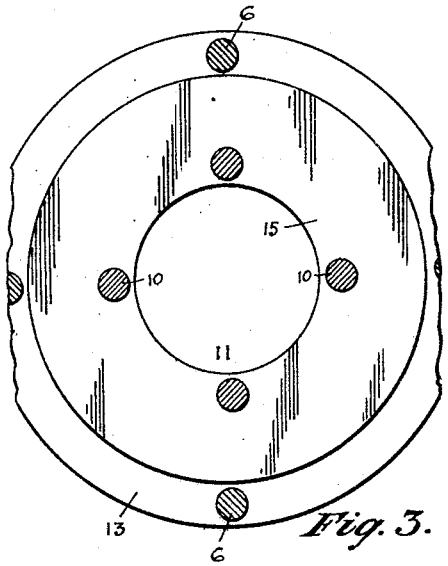

Fig. 3, the same, drawn on the line 3—3, of Fig. 1.

The device is adapted to be connected up in operative position relative to the crank shaft and the transmission shaft of such a motor vehicle without the necessity of fitting or machine work, the supporting connections for the cone clutch ordinarily provided with said motor vehicle serving as supports for this new assembly or parts.

Referring more particularly to the drawing, 1 denotes the crank shaft and 2 the fly wheel of the engine. In mounting the device in place, the male member of the cone clutch, with which the motor vehicle is originally provided, is first removed, and the base plate 3, of a form as indicated in Fig. 1, is secured to the fly wheel by the bolts 4, through the flange 5. As is evident, bolts must be provided which are longer than those first utilized in said automobile for securing the fly wheel to the flange. A plurality of laterally extending pins 6 are riveted to the base plate and located adjacent its outer edge.

A pressure plate 7, formed as indicated in Fig. 1, is secured to the clutch hub 8 by the bolts 9. A plurality of pins 10 are riveted to this plate, extend laterally in a direction opposite to the pins 6, and are located adjacent the edge of a central circular opening, as indicated by 11, in said plate. The base plate is provided with a recessed portion 12 disposed concentrically with said opening, and which permits movement of the pins 10 therein.

Located between the base and pressure plates is a pair of plates 13, flat and annular in form, adapted to slidably engage the pins 6 and revolve around the pins 10. Each of said plates has riveted to either side a friction element consisting of suitable brake lining material, preferably what is known in the art as a thermoid ring or one of Raybestos. The inner surface of the base plate is also provided with an annular section of the same material, and likewise secured in place. Said friction element is generally denoted as 14, and is located on each plate in about the same relative position as indicated in Fig. 2. In this connection, however, it should be taken into consideration that the diameter of the pressure plate is considerably smaller than that of the base plate. The base plate 3, by virtue of its circular recessed portion 12, which permits it to revolve with the fly wheel around the pins 10, and the two annular plates 13, slidably mounted on the pins 6 and adapted to also revolve around the pins 10, constitute the driving plates of the device.

An annular plate 15, smaller in size and of the same diameter as the pressure plate, is disposed between the base plate and one of the plates 13, and another plate of identical construction, also designated as 15, is interposed between the plates 13. Said plates 15 are unlined, are slidably mounted on the pins 10, and obviously, through the recess 12 in the base plate and the fact that the outer circumferential portions of the plates are located inwardly of the pins 6, have a movement which is independent of the driving plates. The pressure plate 7 and the plates denoted 15, comprise the driven plates of the device.

20 denotes a casing, 21 a flange thereupon, to which is secured by the bolts 22, the transmission shaft coupling flange 23, which accommodates the forward end of the transmission shaft 24; 25 the clutch collar, 26 the yoke support, 27 the clutch spring, and 28 the clutch spring tension rod, all being a part of the regular equipment of the motor vehicle, and adapted to perform in connection with this device, their usual functions.

The device, after installation in a motor vehicle, obviously is actuated by the same mechanism already provided for the cone clutch in the original equipment. It affords in such a motor vehicle, without the necessity of changing any of the major supporting elements, a clutch having larger friction surfaces, and at the same time providing gradual engagement of the parts and quick disengagement thereof.

I claim:

A multiple dry disc clutch, comprising in combination with driving means, including an engine fly wheel, and driven means, a base plate, rotatable with the fly wheel, having a plurality of laterally extending pins, and a recessed portion located adjacent to and concentric with its axis, a pair of annular plates in spaced relation slidably mounted on said pins, a pressure plate, rotatably connected with the driven means and in spaced relation with the base plate, having a plurality of laterally extending pins adapted to revolve in said recess, an annular plate slidably mounted on said last-named pins and disposed between the base plate and one of the first-named annular plates, a second annular plate slidably mounted on the last-named pins and disposed between the first-named pair of plates, a friction element fixedly secured to each side of the first-named pair of plates and to the inner surface of the base plate, and means for actuating said clutch.

CLAUD BRASSFIELD.